UNITED STATES PATENT OFFICE.

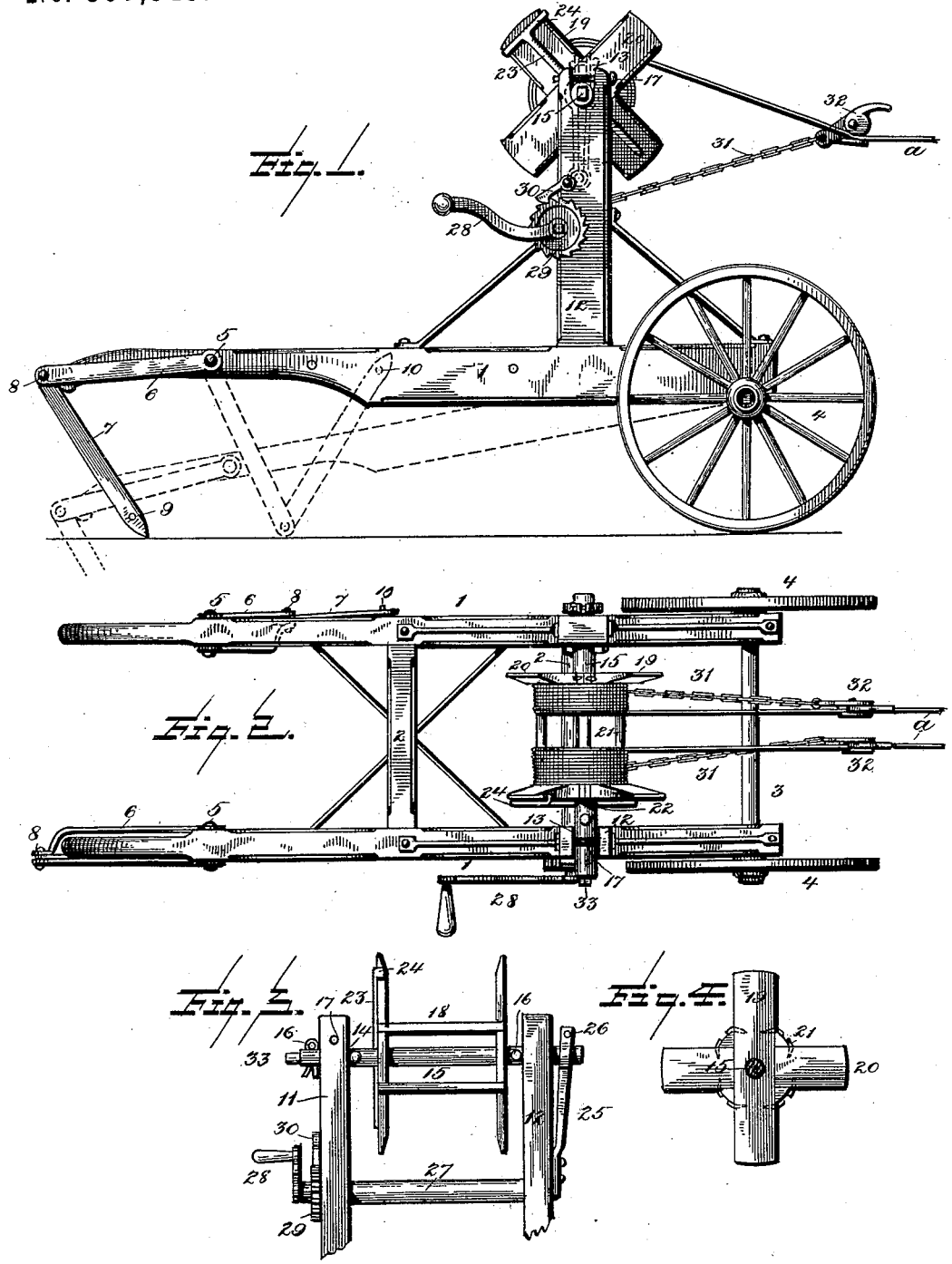

OTTO SAAR, OF COUNCIL BLUFFS, IOWA.

WIRE-REEL.

SPECIFICATION forming part of Letters Patent No. 397,943, dated February 19, 1889.

Application filed July 16, 1888. Serial No. 230,023. (No model.)

*To all whom it may concern:*

Be it known that I, OTTO SAAR, a citizen of the United States, residing at Council Bluffs, in the county of Pottawattamie, State of Iowa, have invented certain new and useful Improvements in Wire-Reels, of which the following is a specification, reference being had therein to the accompanying drawings.

This invention has relation to wire-reels and trucks for the same for use in connection with the building of telegraph-lines, barbed and other wire fences, and with fence-machines, and among the objects in view are to provide a reel that will pay the wire out under tension, and a truck for the same that is capable of being anchored at any suitable point and easily transported from one point to another.

Other objects and advantages of the invention will hereinafter appear, and the novel features thereof will be particularly pointed out in the claims.

Referring to the drawings, Figure 1 is a side elevation of a wire-reel and truck constructed in accordance with my invention. Fig. 2 is a plan. Fig. 3 is a rear elevation of the wire-reel and a portion of its support, and Fig. 4 a detail in side elevation of the reel.

Like numerals of reference indicate like parts in all the figures of the drawings.

1 represents the two parallel side beams of the truck, which are formed with handles at their front ends and connected together by suitable cross-pieces, 2, and at their rear ends there is journaled a transverse axle, 3, provided with wheels 4. Near the front ends of each of the beams 1 there is pivoted, as at 5, a beam-embracing link, 6, having a leg, 7, pivoted, as at 8, to its forward end, which leg terminates in a penetrating-point and is provided with an aperture, 9. By swinging the link downwardly so as to rest upon the ground, and swinging the leg 7 so that its upper end is against the beam 1, the aperture 9 takes over a pin, 10, projecting from said beam, and a support is formed to maintain the truck in a parallel position. (See dotted lines, Fig. 1.) By swinging the link to the front and driving the leg 7 into the ground, as shown by dotted lines in said figure, a suitable anchorage for the truck is formed, whereby the truck-reel is adapted for operation in connection with any ordinary fence-machine or for building telegraph or telephone lines.

Projecting upwardly from the beams 1 and opposite each other is a pair of vertical standards, 11 and 12, respectively, the latter being bifurcated or formed with an open bearing, 13, at its upper end, and the former being perforated or formed with an opening to form a bearing, 14. Within the bearings 13 and 14 there is inserted removably a shaft, 15, which is held in a central position with relation to the standards by pins 16 and against an upward movement from the open bearing by a cross-pin, 17, inserted through the standard. Upon this shaft is mounted a removable wire-carrying reel, 18, which, as will be seen in Fig. 4, is formed with the opposite vertical and transverse side pieces, 19 and 20, respectively, and the longitudinal strips 21, connecting the two sides and forming the spool portion for the reception of the wire. The reel thus constructed is removable from the shaft 15, and for the purpose of securing said reel rigidly upon the shaft I perforate said shaft, as at 22, and insert through the perforations a rod, 23, having a laterally-spread embracing-head, 24, adapted to embrace one of the side pieces, 19 or 20. A bifurcated spring-clamp, 25, is secured to the outer face of the standard 12, and extends up and embraces the end of the shaft 15, the ends of said clamp being adjustably held by a binding-screw, 26, so that by the operation of said screw more or less tension may be exerted by the clamp upon the reel-shaft.

Below the shaft 15 is journaled in the standards 11 and 12 a transverse shaft, 27, which is provided at one end with an operating-crank, 28, and an intermediate ratchet-wheel, 29, in which a gravity-pawl, 30, pivoted to one of the standards is adapted to operate. Connected with the shaft 27 and adapted to be wound thereupon is a series of two or more chains, 31, having wire-clamps 32 at their free ends.

The reel is designed to carry and to operate two strands or lines of wire when used in connection with a fence-machine or in building a fence; or, if desired, several strands of wire may be carried by the same reel; or, furthermore, a series of shafts, 15 and 27, may be mounted in the standards 11 and 12.

Taking the parts in the position shown in Figs. 1 and 2, in which a reel is mounted upon the shaft 15, the clamps 32 are connected with the wires $a$, and by the operation of the crank 28 said wires may be drawn so as to take up slack between the poles or posts, and the slack thus taken up may be wound upon the reel by removing the crank 28 and mounting the same upon the squared end 33 of the shaft 15. To pay out the wire, the truck is first anchored, as described, and the tension 25 regulated in accordance with the work to be performed. As the wire is paid out, the shaft 27 carrying the chains unwinds, the pawl being thrown out of connection with the ratchet 29. When the entire length is consumed, the same is rewound upon the shaft 27 and the clamps are connected with the wires $a$ at a new point, and the operation is repeated.

Having described my invention and its operation, what I claim is—

1. A truck-frame provided with a folding leg adapted to be driven in the ground to form an anchorage, substantially as specified.

2. A truck-frame provided with a folding leg adapted to be driven in the ground to form an anchorage and to be bent to form a support, substantially as specified.

3. The combination, with a shaft, of a removable wire-reel, and a reel-embracing pin inserted through the shaft, substantially as specified.

4. The combination of a truck-frame having opposite standards with a removable shaft, a removable wire-reel mounted on the shaft, and a reel-embracing pin inserted through the shaft, substantially as specified.

5. The beams 1, in combination with the links 6, pivoted as at 5, and the legs 7, pivoted to the links, as at 8, substantially as specified.

6. The beams 1, having the pin 10, in combination with the links 6, pivoted, as at 5, to the beams, and the legs 7, pivoted to the links, as at 8, and provided with the perforation 9, adapted to take over the pin 10, substantially as specified.

7. The shaft 15, perforated, as at 22, in combination with the reel-sections 19 and 20, and the pin 23, inserted through the shaft and having the head 22 for embracing one of the sections, substantially as specified.

In testimony whereof I affix my signature in presence of two witnesses.

OTTO SAAR.

Witnesses:
C. DEITKEN,
J. D. EDMUNSON.